June 3, 1941.　　　B. ROWAN　　　2,243,981
AUTOMOBILE COVER
Filed Nov. 24, 1939　　　2 Sheets-Sheet 1
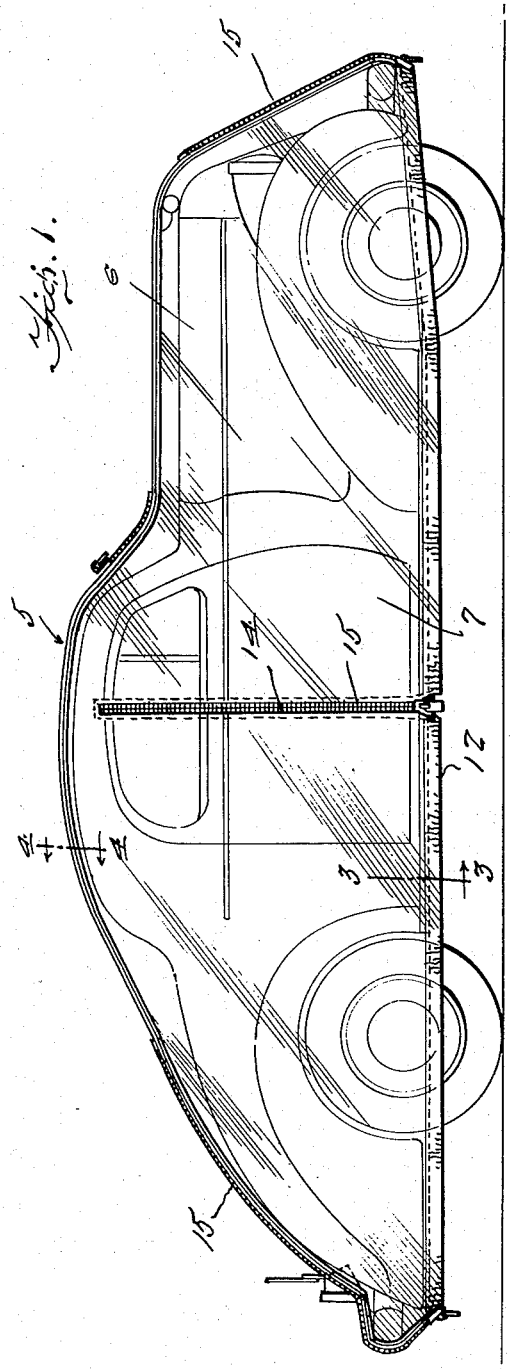
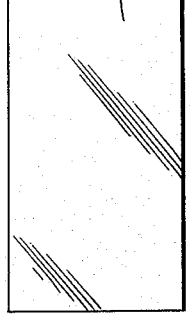
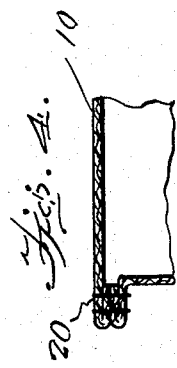
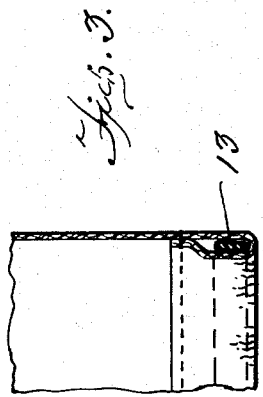
Inventor
*Bridgie Rowan*
By *Clarence A. O'Brien and Hyman Berman*
Attorneys June 3, 1941.  B. ROWAN  2,243,981
AUTOMOBILE COVER
Filed Nov. 24, 1939  2 Sheets-Sheet 2
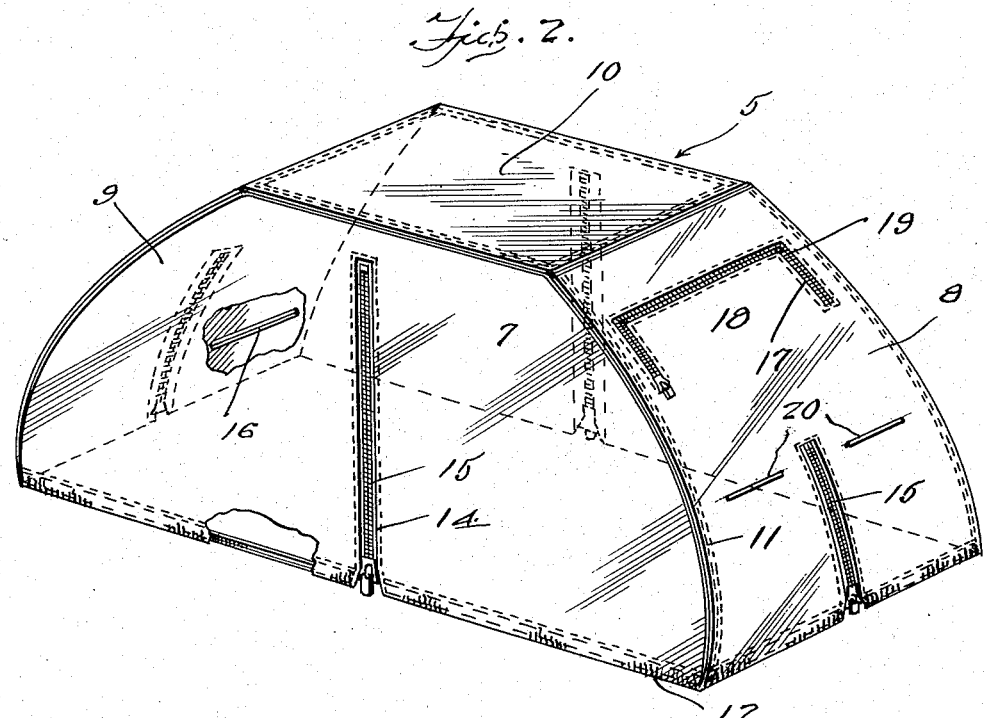
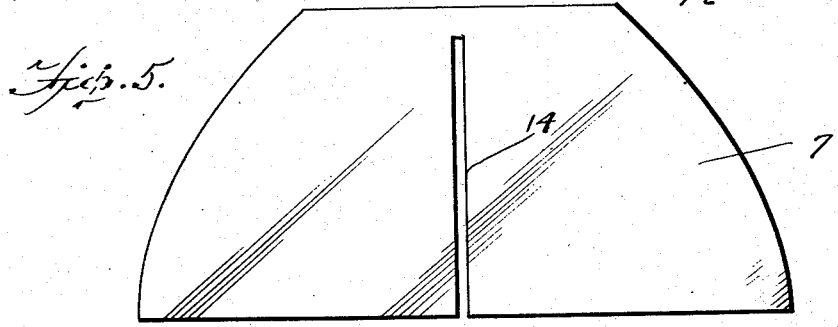
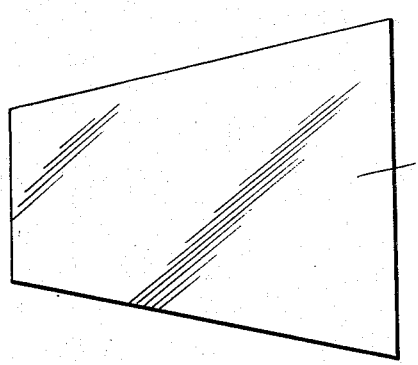
Inventor
Bridgie Rowan
By Clarence A. O'Brien
and Hyman Berman
Attorneys Patented June 3, 1941

2,243,981

UNITED STATES PATENT OFFICE 2,243,981

AUTOMOBILE COVER

Bridgie Rowan, Chicago, Ill.

Application November 24, 1939, Serial No. 306,007

1 Claim. (Cl. 296—136)

This invention relates to an automobile cover especially adapted for protecting an automobile from weather conditions, such as rain, snow, dew and moisture from large bodies of water and also sun rays, and has for the primary object the provision of a device of this character which will be water and sun proof and may be easily and quickly applied and removed from an automobile and when applied thereto will efficiently protect the body finish.

Another object of this invention is the provision of a device of this character which will permit entrance and exit from the automobile when applied thereto and also will expose to view the license plates and permit the windshield glass to be uncovered should it be desired to drive the automobile for a limited distance.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating an automobile equipped with a cover constructed in accordance with my invention.

Figure 2 is a perspective view illustrating the cover with portions thereof broken away.

Figure 3 is a detail sectional view taken on the line 3—3 of Figure 1.

Figure 4 is a detail sectional view taken on the line 4—4 of Figure 1.

Figure 5 is a plan view illustrating one of the side panels of the cover.

Figure 6 is a plan view illustrating one of the end panels of the cover.

Figure 7 is a plan view illustrating the top panel of the cover.

Referring in detail to the drawings, the numeral 5 indicates as an entirety a cover of a shape which will permit the placing thereof over an automobile 6, as shown in Figure 1 to completely cover the automobile to within a limited distance of the ground. It is preferable that the cover 5 be constructed of a suitable waterproof fabric or equivalent material so as to readily shed rain, snow, moisture or the like and thereby preserve the finish of the automobile body. Also the cover will prevent sun rays from striking directly against the body and damaging its finish should the latter be wet or slightly damp from dew or the like when contacted by sun rays.

The cover 5 principally consists of side panels 7, front and rear panels 8 and 9 and a top panel 10. The adjacent edges of the panels are stitched together, as shown at 11, so that these various parts will be made or assembled into a single unit. The lower edges of the panels 7, 8 and 9 are provided with hems 12 to receive elastic strips 13 having the ends thereof suitably attached to their respective panels. The purpose of the elastic strips is to bring about tight fitting of the lower edges of the cover about the automobile.

The front, rear and side panels have slots 14 which open outwardly through the lower edges of said panels and are normally closed by separable fasteners 15 each preferably in the form of a zipper. These slots when open will permit the easy and quick application and removal of the cover from the automobile. Also the slots within the side panels will permit opening of the cover while on the automobile to give entrance and exit to the body of said automobile.

The rear panel 9 may be provided with a slot 16 to allow the license plate and its bracket of the automobile to extend through the cover so that the license plate will be in clear view while the automobile is encased in the cover, this being desirable when the automobile is left parked on a street or highway so as to meet police regulations.

The front panel has a substantially U-shaped slot 17 which forms in said panel a flap 18 directly in the front of the windshield of the automobile and which may be folded downwardly to expose the glass of the windshield and permit an occupant of the automobile to readily see through the windshield for the purpose of driving the automobile for a limited distance while shrouded.

The slot 17 is normally closed by a separable fastener 19 also preferably in the form of a zipper which will permit easy and quick opening and closing of the flap 18.

In sewing the panels of the cover together it is preferable that the edges of the panels be bent upon themselves and stitched together, as shown at 20, so as to provide strong and durable connections between said panels as well as providing substantially leakproof seams.

From the foregoing description, taken in connection with the drawings, it will be seen that a very efficient and practical cover has been provided for an automobile for the purpose of protecting the finish of the automobile body from climatic conditions and is especially useful on an automobile when left parked subject to such conditions and especially around large bodies of salt water where it is a known fact that the salt coming in contact with parked automobiles quickly deteriorates or destroys the finish of the automobiles.

The rear or tail-light of the automobile may be exposed by the slot 16 and the front wall 8 is provided with slots 20 to permit light rays from the headlights of the automobile to shine through the cover if it is desired to have the automobile lighted at any time when the cover is thereon.

It is believed that the simplicity and advantages of this invention will be apparent to those skilled in the art to which such a device relates, and while I have herein set forth a satisfactory embodiment of the invention, it is to be understood that such changes therefrom as fairly fall within the scope of my claim may be resorted to when desired.

Having thus described my invention, what I claim is:

A box-like slip-over cover for a streamline automobile comprising a top panel of substantially rectangular shape, a pair of duplicate side panels of general rhomboidal shape having horizontal straight-across upper edges sewn to the adjacent side edges of said top panel and the vertical end edges of the side panels gradually curving downwardly and outwardly and projecting beyond the transverse ends of said top panel, a rhomboidal front panel located between projecting curvate ends and having its top edge sewn to the complemental front edge of the top panel and the diverging side edges sewn to the front vertical edges of the side panels, said front panel being adapted to cover the frontal portion and hood with its rear portion designed to extend over the windshield, the upper portion of the front panel having an inverted U-shaped slit therein defining and forming a flap for exposing the windshield when the flap is swung down, a slide fastener for holding the flap in normally closed position, the lower end of the front panel having a vertical slit therein centrally arranged, a slide fastener for closing the slit, a rear panel having its upper edge connected to the rear edge of the top panel and its side edges connected with the rear end edges of the side panels and said rear panel having a centrally arranged vertical slit therein extending from its lower edge upwardly to a point spaced from the upper edge, a slide fastener for closing the last-mentioned slit, centrally arranged vertical slits in the side panels extending from the lower edges upwardly to points slightly spaced from the upper edges of the side panels, slide fasteners for closing the last-mentioned slits, the lower edges of the entire cover having a hem and horizontally extending elastic strips in the hem, each elastic strip extending from the lower end of one slit to the lower end of the adjacent slit, and said elastic strips holding the lower edge of the cover tightly around the lower part of the automobile.

BRIDGIE ROWAN.